Aug. 11, 1942. H. H. FITCH 2,292,934
STOKER FEED WORM STRUCTURE
Original Filed May 21, 1938
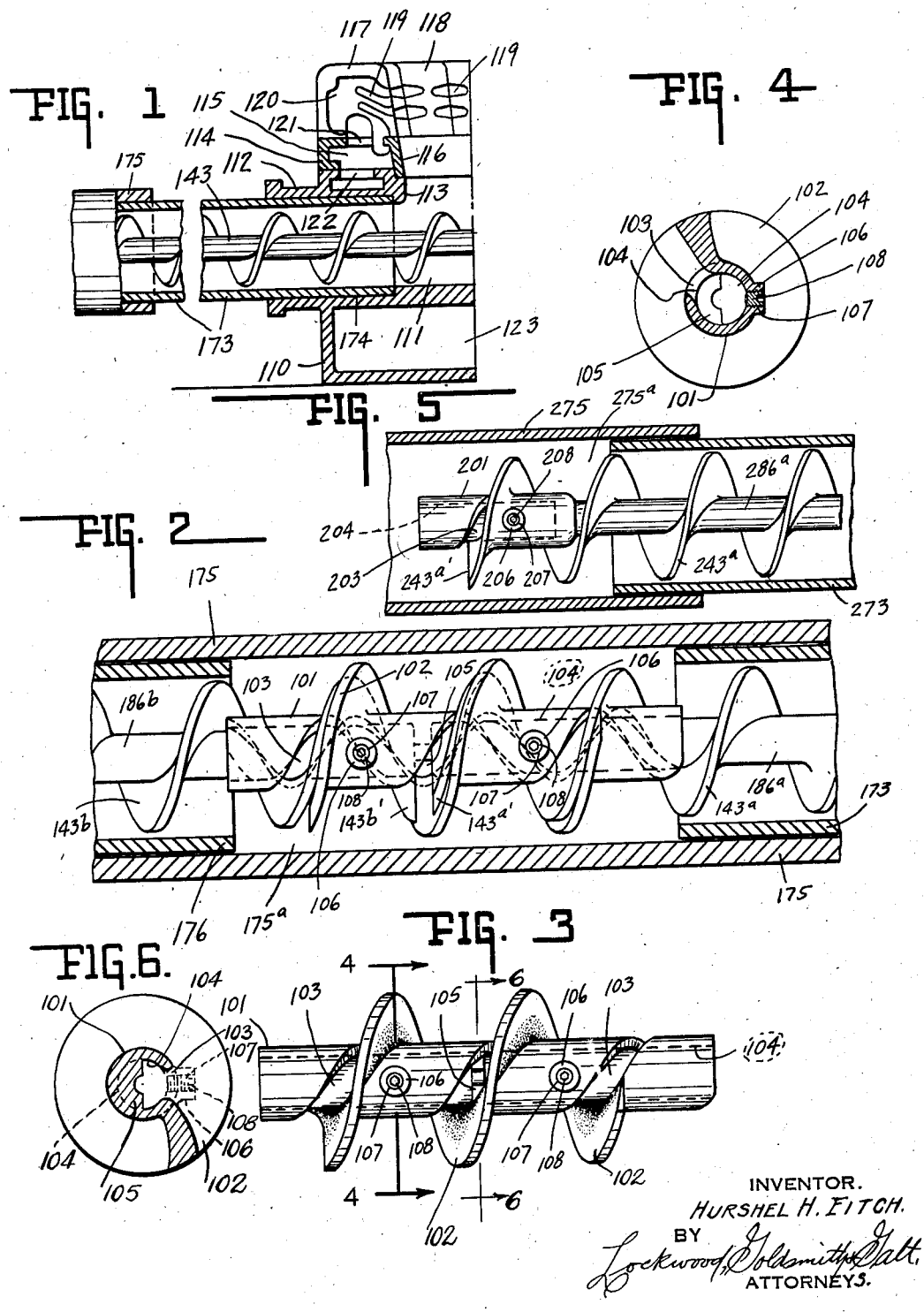
INVENTOR.
HURSHEL H. FITCH.
BY
Lockwood, Goldsmith & Galt,
ATTORNEYS.

Patented Aug. 11, 1942

2,292,934

UNITED STATES PATENT OFFICE 2,292,934

STOKER FEED WORM STRUCTURE

Hurshel H. Fitch, Auburn, Ind., assignor to Auburn Foundry Inc., Auburn, Ind., a corporation Original application May 21, 1938, Serial No. 209,278. Divided and this application July 23, 1941, Serial No. 403,729

12 Claims. (Cl. 198—213)

This invention relates to a stoker feed worm structure for supplying solid fuel from a hopper, but more particularly a bin, to a furnace, boiler, or the like, arrangement.

This application is a division of the copending application, Serial No. 209,278 filed May 21, 1938, entitled, "Line drive and feed for stoker," the last mentioned being a continuation-in-part of application Serial No. 90,090, now Patent No. 2,208,751 dated July 23, 1940.

One object of this invention is to provide in a fuel feeding worm for a solid fuel consuming vice such as of the underfeed retort type, a detachable construction so that the fuel feeding construction may be readily adjusted in the field, more particularly when the solid fuel consuming device is associated with a bin for bin feed supply of fuel to the fuel consuming device.

This invention has as its primary feature, the parting of the fuel feeding worm and the worm enclosing tube structure and associating the parted portions of the worm by a reversible driving connection and the parting of the worm enclosing tube, the latter parting permitting access to the reversible detachable driving connection between the worm parts so that the length of the worm may be readily adjusted, as hereinafter pointed out and more particularly accurately adjusted without the necessity of welding and like operations in the field.

It is to be understood that the worm is supplied in standard lengths of different sizes and that the worm enclosing tube is likewise supplied in different lengths of standard size and accordingly, the invention permits in the field of the use of standard length worms or a fraction thereof sufficient to obtain the desired approximately overall worm lengths. This worm section or length may be readily cut with a hacksaw or the like. When associated with the adjacent end of another and aligned worm length and through the instrumentality of the present invention, the two or more worm lengths connected together may be accurately adjusted to the required overall worm length, as will be more fully set forth hereinafter. The adjacent ends of the two worm enclosing tubes are similarly enclosed by a telescopically and enveloping tube, which is of sufficient length to permit of adjustment axially of the resulting enclosing overall tube and also permit of sufficient accommodation so that the tube parts may be adjusted in accordance with worm requirements.

A further feature of the invention consists in so arranging the parts that the connection between the worm sections and the connection between the worm enclosing tube sections is of such character that the cross-sectional area therebetween at any transverse section is substantially the same, thereby preventing any constriction in the fuel supply.

Other objects and features will be set forth more fully hereinafter.

The full nature of the invention will be understood from the accompanying drawing and the following description and claims.

In the drawing Fig. 1 is a longitudinal, sectional view through a half portion of a conventional solid fuel consuming device, such as an underfeed stoker arrangement, together with the fuel supplying worm and the worm enclosing tube structures, the latter including detachable connections shown more clearly in the lefthand portion of said figure.

Fig. 2 is a longitudinal central sectional view on a considerably larger scale of the worm tube structure embodying the detachable connection.

Fig. 3 is an elevational view of the worm connector per se.

Fig. 4 is a transverse, sectional view thereof taken on line 4—4 of Fig. 3 and in the direction of the arrows.

Fig. 5 is a view similar to Fig. 2 of a modified form of the invention showing the coupling end of a driving worm.

Fig. 6 is a view similar to Fig. 4 and taken on line 6—6 of Fig. 3 and in the direction of the arrows.

In Fig. 1 of the drawing there is illustrated a portion of a main casting 110 having a curved channel 111 extending therethrough and terminating in a projecting collar portion 112 of tubular character. It also includes a central throat 113. A casting 114 superimposed thereabove includes the annular chamber 115 formed by the throat portion 116. Superposed thereabove is the tuyère construction 117 having the fuel receiving portion or hopper 118 and the air supplying openings 119 which communicate with the chamber 120 within the tuyère structure. This chamber 120 in turn communicates as at 121 with the chamber 115 which in turn communicates as at 122 with the chamber 123.

Seated in the portion 112 is a worm enclosing tube 173. This worm enclosing tube has its retort end seated in the socket 174. There also is provided a worm enclosing tube 176. These two tube sections are in axial alignment and an enveloping connecting tube 175 constitutes the splice or sleeve and said tube 175 has an appreciable length at each end telescoping the adjacent closed ends of the aligned tubes.

Within the tube is a worm 143. This worm is sectionalized and it includes a central portion supporting a flight. In Fig. 2 the central portion of one worm is indicated by the numeral 186a and the worm flight thereon by the numeral 143a. The tube 173 is shown enveloped by tube 175 and the latter at its opposite end envelopes the tube 176. Within that end of the tube is the shaft portion 186b of the aligned worm portion and having the flight 143b thereon.

Referring more particularly to Figs. 2 to 4, inclusive, it will be noted that between the adjacent ends of the tubes 173 and 176, said ends being designated by the subscript a, there is provided a space and this space varies in accordance with the adjustment. It will be noted—see Fig. 2—the sleeve 175 telescopes both of the before mentioned aligned tubes and provides a space therebetween designated by the numeral 175a. This same figure shows the flight 143a terminates at 143a' and that the flight 143b terminates at 143b'.

Mounted in said enlargement is a spiral strip 101 that on one edge carries a flight 102, the pitch of which corresponds with that of flights 143a and 143b. The spiral strip is arranged in tubular form providing the coaxial bore 104 therethrough. All adjacent portions of the two adjacent turns are spaced apart to form a spiral passage 103. The bore receives the shaft portions 186a and 186b. The passage 103 permits flights 143a and 143b to project through or beyond the strip adjacent flight 102. The effective diameter of flight 102 is at least equal to but may be greater than that of 143a and 143b, as illustrated.

Abutment 105 in the bore 104 serves as a stop and may be engaged by ends of shafts 186a and 186b, if desired. Strip 101 mounts two embossments 106 apertured at 107 and threaded to receive headless set screws 108 for clampingly locking the shafts 186a and 186b to strip 101 in adjusted position in the bore 104 thereof.

The two worms abut against the small stop in the inside of the coupling. The worm 186a drives against this stop or lug. The set screws are used on the coupling simply to keep the worms from backing out of the coupling.

It will be noted the coupling is slightly larger in diameter than the main worm portions. This increase in flight and tube diameter provides an increased fuel carrying capacity because the extra metal that is put into this coupling would normally cut down the carrying capacity of the device at the coupled connection. This increase in diameter, however, offsets this loss in volume. As shown in the drawing, the increased diameter of the coupling substantially conforms to the outside diameter of the tubes enclosing the worm portions 143a and 143b.

The employment of this coupling arrangement eliminates welding in the field and permits the parts to be sectionalized so that extremely long parts are not required. This coupling arrangement also provides a much simpler installation. In obtaining the desired overall worm length, either worm element 143a or 143b may be cut off square at its edges 143a' and 143b', respectively, and associated with the coupling.

In Fig. 5 there is illustrated a modified form of the invention. In this figure, numerals of the two hundred series indicate parts like or similar to those illustrated in Figs. 2 and 3 and designated by similar numerals of the one hundred series.

This embodiment contemplates the formation of the spiral or worm coupling portion integral with the worm portion 286a—243a. The adjacent worm—see left hand end of Fig. 2—is associated therewith and secured by set screw 208.

Preferably in each modification the arrangement is such that power (rotation) is applied so that the coupling tends to automatically lock the parts together.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a stoker structure tube means, a pair of aligned fuel feeding worms therein, the pitch and direction of flights therein being substantially the same, and a tubular coupling in the tube means including a worm shaft receiving bore and a spiral passage for worm flight reception and having external flight means similar to the worm flights.

2. In a stoker structure, a coupling of the character defined by claim 1, characterized by the addition of stop means within the bore.

3. In a stoker structure, a coupling of the character defined by claim 1, characterized by the addition of spaced set screws for locking each of the worms in adjusted position in the coupling.

4. In a stoker structure, a coupling of the character defined by claim 1, characterized by the addition of spaced set screws for locking each of the worms in adjusted position in the coupling, and stop means for worm shaft engagement within the bore.

5. In a stoker structure as defined by claim 1, characterized by the tube means including a pair of axially aligned but spaced tubes, and an external tubular connection therebetween forming an enlarged chamber between tube ends, said coupling flight means having an effective external diameter greater than that of the interior of the aligned tubes and positioned in the enlarged chamber.

6. In a stoker structure, a coupling of the character defined by claim 1, characterized by the addition of spaced set screws for locking each of the worms in adjusted position in the coupling, and stop means for worm shaft engagement within the bore, said tube means including a pair of axially aligned but spaced tubes, and an external tubular connection therebetween forming an enlarged chamber between tube ends, said coupling flight means having an effective external diameter greater than that of the interior of the aligned tubes and positioned in the enlarged chamber.

7. A worm construction for stokers and the like, including a pair of axially aligned worms having flights of light pitch, and a coupling therefor including a worm flight receiving passage arrangement and flight means thereon adjacent the passage for worm flight engagement, the worm flights projecting through the passage arrangement.

8. A construction as defined by claim 7, characterized by the coupling telescopically receiving the adjacent shaft portions of the aligned worms and including an internal stop between the coupling ends.

9. A construction as defined by claim 7, characterized by the addition of spaced locking means carried by the coupling and selectively locking each worm thereto.

10. A worm construction for stokers and the like, including a pair of axially aligned worms having flights of like pitch and a coupling arrangement rigid with one worm and including a worm flight receiving passage and flight means thereon adjacent the passage for engagement with the worm flight of the adjacent worm, the last mentioned worm flight projecting through the passage.

11. A worm construction as defined by claim 10, characterized by the addition of a locking member carried by the coupling arrangement for locking the said adjacent worm thereto.

12. In a stoker structure tube means, a pair of aligned fuel feeding worms therein, the pitch and direction of flights therein being substantially the same, and a tubular coupling in the tube means including a worm shaft receiving bore and a spiral passage for worm flights reception and having external flights means similar to the worm flights, the spiral passage being adjacent the coupling flight to pass the worm flight in the telescopic association between the worm and coupling, the associated flights thereof lying immediately adjacent each other to form a continuous spiral channel.

HURSHEL H. FITCH.